July 11, 1944.   E. MERTEN ET AL   2,353,484
SEISMIC EXPLORATION METHOD
Filed Jan. 5, 1942

Inventors: Eugen Merten
John P. Woods
By Their Attorney:

Patented July 11, 1944

2,353,484

UNITED STATES PATENT OFFICE 2,353,484

SEISMIC EXPLORATION METHOD

Eugen Merten and John P. Woods, Houston, Tex., assignors to Shell Development Company, San Francisco, Calif., a corporation of Delaware Application January 5, 1942, Serial No. 425,594

2 Claims. (Cl. 181—0.5)

This invention pertains to the art of seismic exploration, and relates more specifically to improvements in methods of generating seismic waves in the ground.

Seismic methods are concerned with the measurement of the time intervals between the moment when a disturbance is created in the ground, for example, by means of an explosion, and the moments when the seismic waves generated by said explosion arrive at each of a plurality of instruments, such as seismometers or seismic detectors, located at predetermined distances from the explosion or shot point and from each other. The detectors translate the mechanical energy of the seismic waves into electrical impulses, which are then transmitted to a galvanometer or recorder capable of registering or photographically recording said impulses. Suitable amplifiers are usually interposed between a detector and its recording element.

The customary method of generating elastic ground waves for purposes of seismic exploration consists in drilling a shot hole of a relatively small diameter to a desired depth, placing therein a charge of dynamite, usually filling the shot hole with water (so-called water-tamping, which permits several shots to be fired in the same hole), and exploding said charge.

This method, which results in the concentration of the whole explosive energy at a single point (a so-called point-source of energy), has the drawbacks of, first, disfiguring the character of the signal sent through the ground on successive explosions, and, second, of wasting or making unavailable a large portion of said energy due to the divergence of the rays or lines along which a spherical elastic wave front travels through the ground, as will be explained hereinbelow.

It is therefore an object of the present invention to provide an improved method of seismic shooting wherein said drawbacks are eliminated by the use of an explosive charge adapted to distribute its effect over a wide superficial area, preferably located in a substantially horizontal plane.

It is also an object of this invention to provide a method of seismic shooting involving the use of a particular type of explosive, namely, a gaseous explosive material or mixture, it having been found that the burning or explosion rates of such gasoline mixtures have none of the formation-shattering or signal-disfiguring properties noted above with regard to dynamite, but are highly suitable for generating seismic impulses of especially well adapted shape for seismic recording purposes.

It is also an object of this invention to provide a method of seismic shooting whereby an improved efficiency of transfer of the explosion energy to the ground is achieved by the use of a gaseous explosive material or mixture.

It is also an object of this invention to provide a method of seismic shooting whereby an elastic impulse is generated in the ground, and a signal of distinctive character is sent through said ground from the shot point to the detector apparatus by the use of a gaseous explosive material or mixture.

It is also an object of this invention to provide a method of seismic shooting wherein the exploding charge is inherently in contact with relatively extensive substantially horizontal surfaces of the medium surrounding said charge.

It is also an object of this invention to provide a method of seismic shooting wherein the facing of the explosion cavity with so-called "transmission medium" materials, and sometimes the drilling of the shot hole itself, may be dispensed with.

These and other objects of the invention will be understood from the following description taken with reference to the attached drawing wherein.

Figure 1:
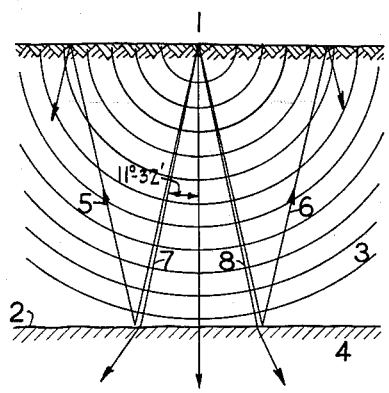
Fig. 1 is a diagram schematically showing the transmission of energy from a point source.

As stated above, the transfer of the explosion energy to the ground from a point source, as shown in Fig. 1, is effected through a very limited area, and consequently pressures far in excess of the rupture point of the rock, or other material in which the shot hole is formed, are necessary to generate seismic waves of sufficient energy for the detection of reflections from the various layers. Each successive charge of dynamite produces a deformation of the shot hole and the surrounding space. From each change in the nature of the cavity there results therefore a change in the nature of the signal which is highly undesirable in seismic recording.

When, on the other hand, the area over which the explosion imparts elastic energy to the ground is increased, the pressure to be generated may be given a smaller value without diminishing the energy of the resulting seismic waves. In particular, it is possible to increase the area over which the explosive energy is transmitted to the ground to such an extent that pressures not in excess of the rupture point of the rock or other ground formations will still generate seismic waves having sufficient energy to permit the detection and recording of reflections from deep layers.

Thus, the use of a large area for the transfer of energy to the ground will permit the use of an explosion of less intensity for supplying an adequate amount of said energy, will not result in a deformation of the shot hole, as in the case of dynamite, and will therefore give a signal of improved constancy characteristics.

Furthermore, when a source of energy is essentially a point source, as in the case of a charge of dynamite exploded in a shot hole, there occurs a divergence of energy due to the spherical nature of the wave generated by the explosion. If, however, the source of energy has a finite area in a substantially horizontal plane, as provided for by the method of the present invention, then, for distances of the order of magnitude of the linear dimensions of said area, the effect of the divergence of energy is much less than in the case of a point source.

The importance of this consideration is that near the surface of the ground there is nearly always an interface with a large reflection coefficient, namely, the interface between the so-called weathered layer and the next underlying layer. It is proposed according to the present invention to make the horizontal area to which the explosive energy is applied sufficiently large for its linear dimensions to approach the order of magnitude of the depth of this highly reflecting surface.

Because of the decrease in the initial divergence of the energy that results from the application of the present method, a substantially larger percent of the total energy of the explosion will pass through the aforesaid interface and penetrate the deeper layers.

The major portion of the energy that is reflected from said shallow interface remains permanently confined within the surface layer, and forms, until finally dissipated, a disturbance which masks the energy which is reflected from the deep layers, and which is the one of particular interest for seismic surveying purposes. When dynamite is used, the energy reflected from the deep layers can be increased by increasing the amount of dynamite, but at the same time there is a proportionate increase in the energy confined in the surface layer. Therefore, there is no gain in the clearness of the recorded images of the amounts of energy reflected from the various deep layers.

The present method, on the other hand, makes it possible for a larger percent of the explosion energy to penetrate the aforesaid shallow interface. Thus the increase in the reflected energy is in this case at the expense of the energy confined in the surface layer, whereby an appreciable improvement in the clearness of the signals is realized.

This may be best illustrated by the following example:

Referring to Fig. 1, 1 indicates a point source of explosive energy and 2 is a shallow interface between the layer 3, in which the point source is located, and an underlying layer 4 in which the elastic wave velocity is, for example, five times greater than in the overlying layer 3, each layer being assumed to be homogeneous. All rays (along which the spherical wave front travels) whose initial incidence angle with the vertical is greater than about 11°32' (arc sin. 0.2) will in such case be retained permanently in the surface layer 3, as shown with regard to rays 5 and 6, and only rays having an incidence angle smaller than 11°32' will be transmitted to the layer 4, as shown with regard to rays 7 and 8. By computing the solid angle 7—1—8, it may be found that only about 2% of the energy generated by the explosion reaches the boundary 2 under favorable angles. Only about ½ of this energy, that is, 0.01 of the total, will penetrate into the layer 4.

Figure 2:
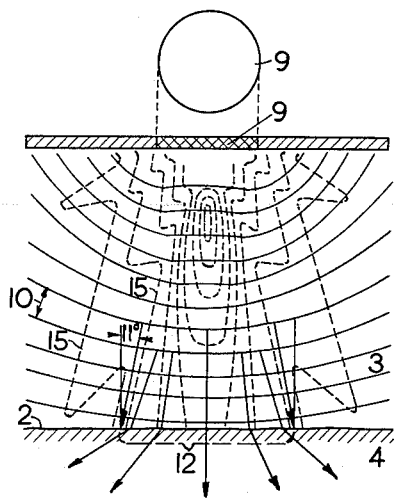
Fig. 2 is a diagram schematically showing the transmission of energy from a source arranged according to the present invention.

To make an approximation in the case of an explosive charge distributed over a surface, comparison may be made with an acoustical example. Referring to Fig. 2, it may be shown that if energy is applied to a circular piston 9 of a diameter approximately 3.5 times the wave length indicated at 10, which piston acts on the surface of a compressible medium or fluid, the nature of the wave field widely departs from that obtained in the case of a point source. Fig. 2 shows that the energy is concentrated in the direction of the axis of the piston. As an example, if the boundary 2, dividing layer 3 from layer 4, which is five times harder, is located at a distance of approximately three times the diameter of the piston area, then the circular area 12, over which the angle of incidence of the wave fronts is smaller than 11°, is twice as large as in the case of a point source. The amplitude of vibration, whose zones of distribution are shown by dotted lines 15, is enormously increased in this area 12, compared to areas in other directions, while in the case of a point source, the amplitude is independent of the directions. Considering the amplitude values in Fig. 2, it may be estimated that 25% of all energy delivered by the piston travels in wave form towards the boundary 2 under angles of incidence more favorable for penetration than in the case of a point source. Therefore, it may be said that about 0.14 of all energy penetrates into the ground beyond the boundary 2 of sharp speed contrast.

Now, assuming the energy distribution in a plane surface explosion to be nearly the same as in the acoustical example, the penetrating energy of such a plane surface source would be 14 times that of a point source.

If the efficiency of the generation of seismic waves is defined as the ratio of the energy which penetrates the ground past the shallow interface to the energy which remains within the surface layer, then it will seem that for the case of the above numerical examples, the efficiency of the point source shot point is 0.01, as compared with $14/86$ or 0.16 for the plane circular surface source, giving an improvement factor of about 16 in the efficiency of generating seismic waves.

The method of the present invention consists therefore in generating seismic waves by applying energy to relatively large, substantially horizontal areas of ground by means of an explosive agent distributed in substantially uniform contact with said ground.

It has been found that originally gaseous explosive agents, such as explosive gases or gaseous mixtures, are especially suitable for the purposes of this invention, since, first, they do not detonate with sufficient violence to produce a crushing effect on the ground formations, and, second, since they are well adapted to remain in uniformly distributed contact with relatively extended ground areas.

Gases such as methane, natural gas, acetylene, hydrogen, etc., and their mixtures with each other or with oxygen or air may therefore be suitably used. Especially preferred is a mixture of acetylene with oxygen or air, since this mixture can be easily generated within a cavity in the ground and is not critical with regard to the proportions used, possessing explosive properties within wide limits of said proportions. For example, such mixture will explode with 80% of acetylene and 20% of oxygen or air, or with 2.5% of acetylene and 97.5% of air by volume.

The explosive gas may be made available or generated at the surface of the ground, and may then be conveyed or pumped to a desired enclosed cavity within the ground or at the surface thereof, or may be generated directly within said cavity.

An advantageous method of exploding a gaseous mixture according to the method of the present invention, whereby the necessity of drilling a shot hole is entirely eliminated, consists in forming a cavity or ditch at the surface of the ground.

This cavity may be circular (as described with regard to Fig. 2) or may consist of an elongated ditch, being, for example, 30, 50 or more feet in length, and 3, 5 or more feet in width and depth, its longitudinal direction being oriented as desired and being preferably not less than 1/10 of the vertical distance between the surface and the nearest reflecting interface or layer.

Figure 3:
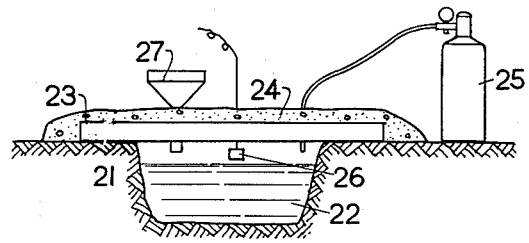
Fig. 3 is a diagram schematically indicating a manner in which the method of the present invention may be used for applying the energy of a gaseous explosive medium to relatively large substantially horizontal areas.

Fig. 3 shows a diagrammatic cross-section view of such a ditch 21, which is filled with water 22, and covered with planking or corrugated iron sheets 23, over which clay or earth 24 may be tamped.

The space between the water level within the ditch and the substantially air-tight cover formed by elements 23 and 24 is filled with an explosive gas, which may be either pumped to said space from a gas reservoir 25, or directly formed within said space, for example, by dumping some calcium carbide through a dumper or funnel 27. The acetylene generated by the reaction of the calcium carbide with water is then exploded by means of a firing device 26, such as a spark plug or a detonator or small detonating charge, which is likewise placed within the enclosed ditch. It will be seen that in this manner a relatively large area of contact is provided between the uniformly distributed gaseous explosive charge and the ground through the medium of water, the surface of the latter forming an extended horizontal area on which the force of the explosion acts.

Another method whereby explosions of gaseous media may be used to generate seismic waves, especially in cases where the shot point is located in porous, permeable, fissured or creviced ground, consists in pumping an explosive gas underground, causing it to fill all the porous spaces and interstices between the ground particles, and exploding it in situ.

Figure 4:
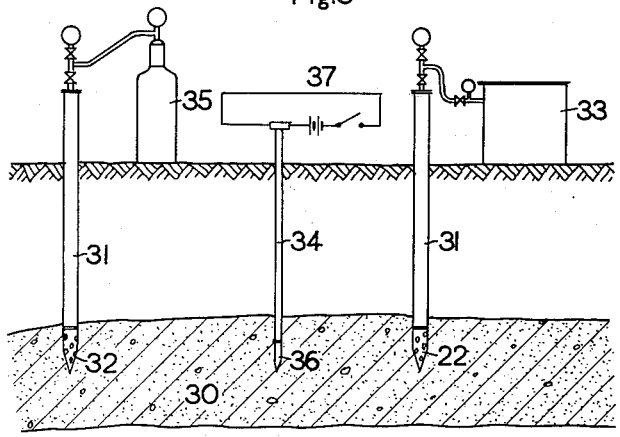
Fig. 4 is a diagram illustrating another way in which the method of the present invention may be applied in the field.

Referring to Fig. 4, a plurality of tubing rods 31, preferably provided with sharpened perforated heads 32, are forced into a porous or creviced formation, such as shown at 30, to a depth of about 10 to 50 feet.

Acetylene generated at the surface in generators 33 is then forced into the ground under suitable pressure through some of the rods 31, while oxygen or compressed air is forced through the rest of said rods from tanks 35. A considerable porous formation volume, underlying, for example, a surface area having dimensions of about 50 feet by 50 feet or more, is in this manner thoroughly filled with an explosive mixture of acetylene and oxygen or air, which is then exploded in situ by means of a detonating device 36, which may be similar to that of Fig. 3, and which may be either lowered into a hole drilled in the ground, or forced into the ground at the end of an auger or rod 34, provided with a suitable electrical firing circuit 37.

If desired, the permeability of the ground, and its capacity to receive in its pores an explosive gas mixture may be increased by a preliminary acid treatment. Thus, in limestone formations, the tubular rods 31 may be first used to force, from suitable containers similar in general to that shown at 33, a charge of hydrochloric or other suitable acid into the formation, which step is followed by that of forcing thereinto, as described above, a explosive gas to fill the pores and interstices enlarged by acid treatment.

It is, of course, understood that if it is desired to explode any other gaseous mixture or gas instead of acetylene within the formation or cavities formed therein, such gas may be generated therein, or pumped thereinto from the surface in a manner generally similar to that described above, the essence of the present invention residing in the generation of seismic wave by means of explosion of an originally gaseous medium, whereby a large amount of the explosion energy is transferred to said formation by providing a large substantially horizontal contact surface between said formation and the explosive medium, and by eliminating the formation-crushing effect particular to high-speed detonating media such as dynamite, whereby a distinctive elastic impulse or signal is sent through the formation.

We claim as our invention:

1. In a method of geophysical exploration wherein seismic waves are translated into electric impulses and recorded, the steps of generating said seismic waves by confining a uniformly distributed explosive charge over a substantially horizontal ground area, the measurement of said area in at least one horizontal direction being at least one-tenth of the vertical distance between said area and the nearest reflecting underground layer, and exploding said charge.

2. In a method for applying a uniformly distributed explosive force to the ground for the purpose of generating and subsequently recording seismic waves, the steps of forming a shallow cavity in a weathered surface layer overlying a reflecting layer, said cavity having a substantially horizontal relatively extended bottom area of at least 90 square feet, a longitudinal measurement of said area in at least one suitably oriented horizontal direction being at least one-tenth of the vertical distance from said area to said reflecting layer, confining an explosive gaseous mixture within said cavity and exploding said mixture.

EUGEN MERTEN.
JOHN P. WOODS.